United States Patent Office

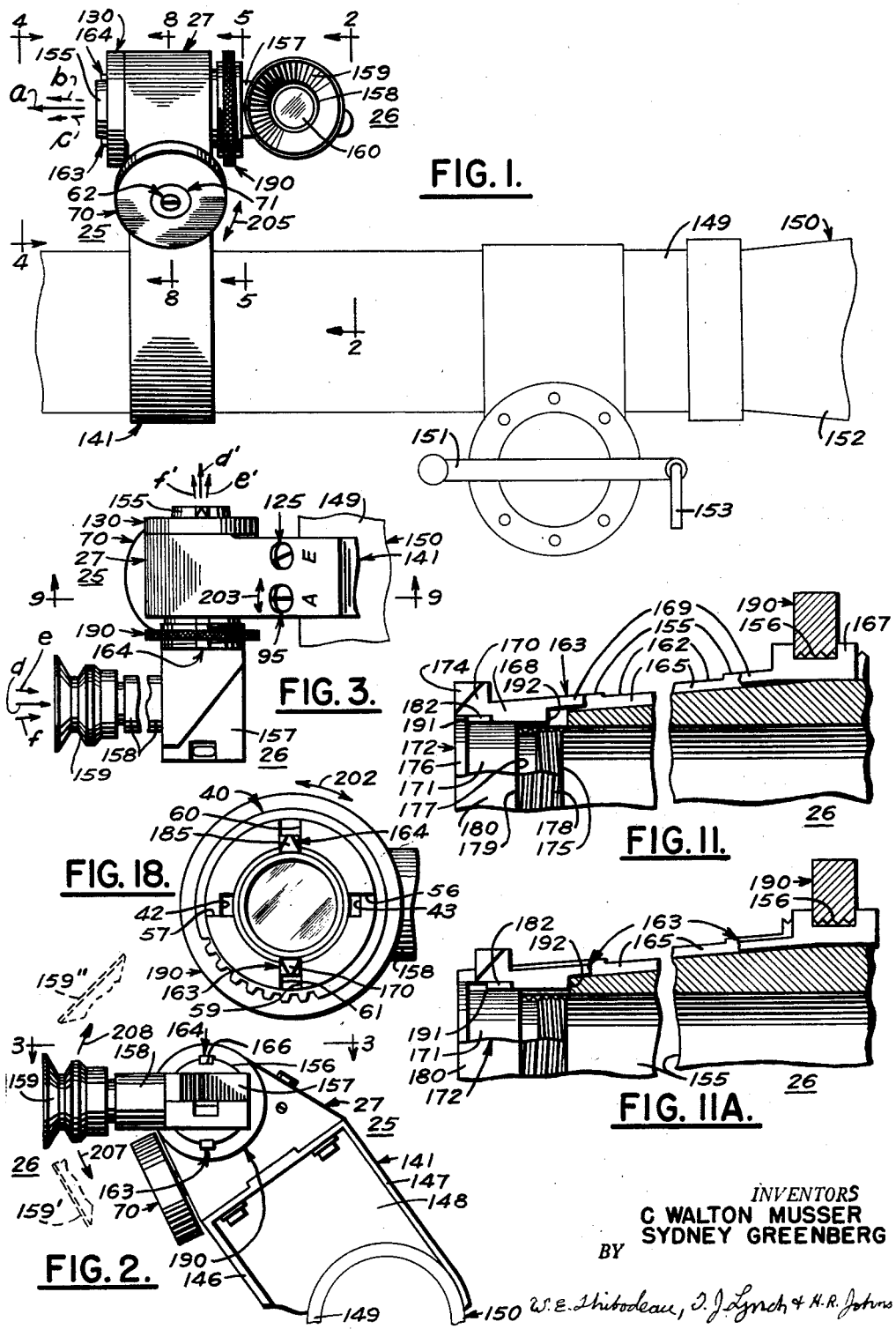

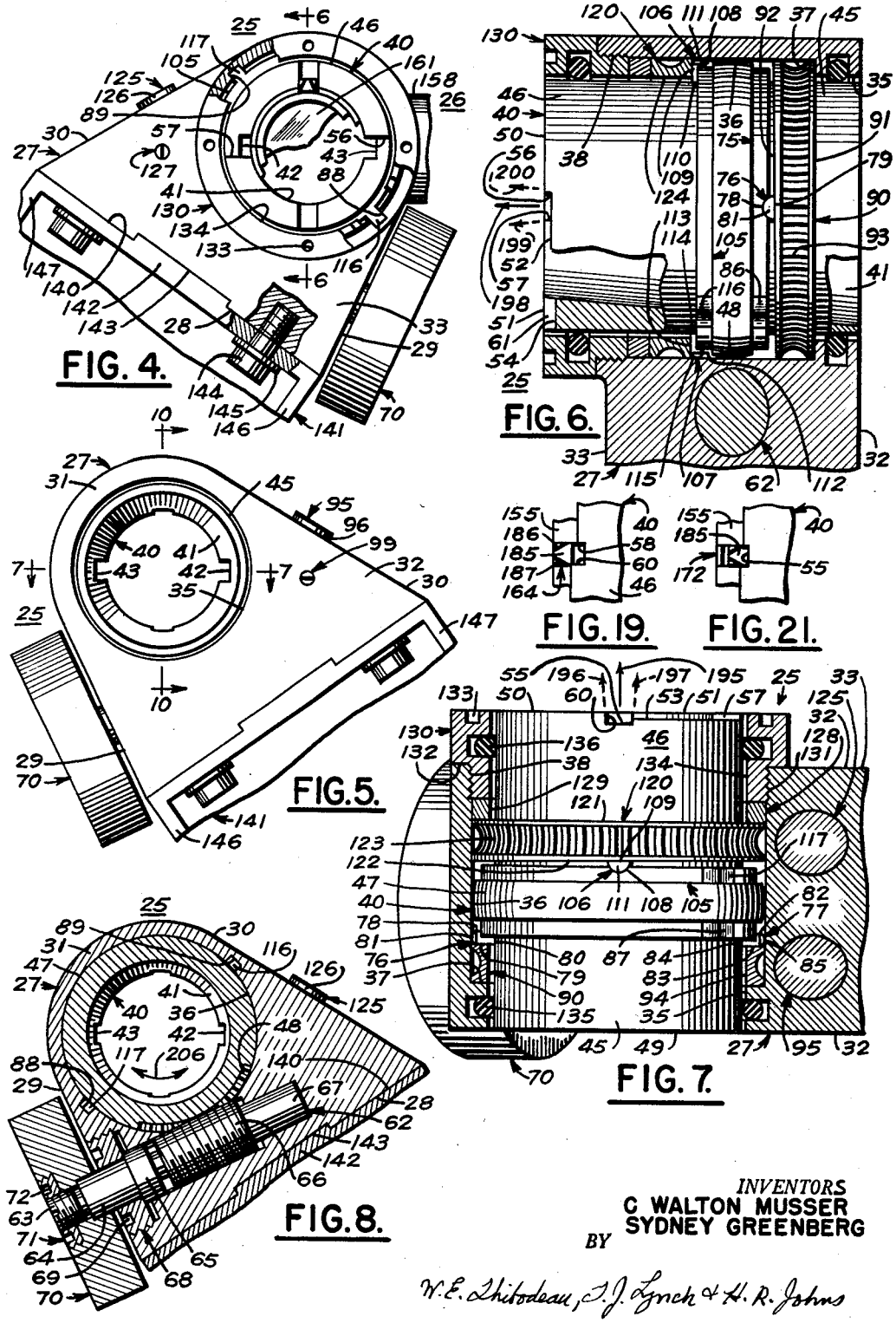

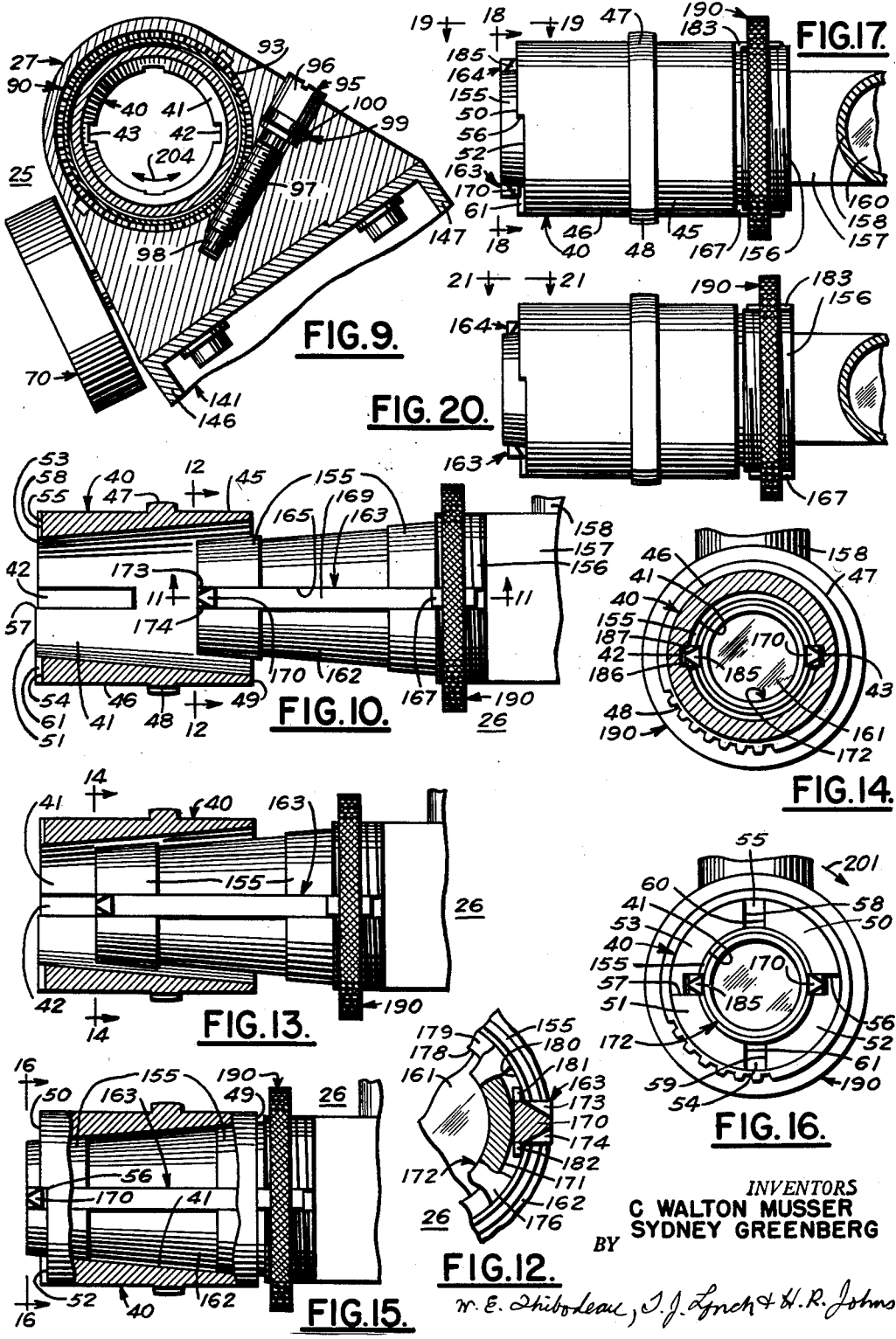

2,889,628
Patented June 9, 1959

2,889,628

COMBINED ADJUSTABLE SUPPORT AND OBJECT RELEASABLY INTERLOCKED THEREWITH

C Walton Musser, Beverly, Mass., and Sydney Greenberg, Philadelphia, Pa., assignors to the United States of America as represented by the Secretary of the Army Application January 11, 1957, Serial No. 633,803

8 Claims. (Cl. 33—48)

(Granted under Title 35, U.S. Code (1952), sec. 266)

The invention described herein may be manufactured and used by or for the Government for governmental purposes without the payment of any royalty thereon.

Broadly stated, our invention relates, coextensively, to supports and to objects supported thereby, which supports may be made so as to be adjustable in one, in two, or in three directions, may be made so as to be releasably interlockable with the objects supported thereby, or may be made so as to be both adjustable, as stated, and releasably interlockable with the objects supported; and which objects may be made so as to be releasably interlockable with the supports.

In particular, although not limited solely thereto, our invention relates, coextensively, to a support for a sighting telescope for a gun, and to the sighting telescope in the support; the support being made so that the position of a sighting reticle in the telescope is adjustable in azimuth and in elevation, is adjustable to correct for cant, and so that the support is releasably interlockable with the telescope; and the telescope being made so as to fit into and to be releasably interlockable with the support. Accordingly, the description of our invention is predicated upon one preferred embodiment dealing with such support and sighting telescope.

At present there exists a need for light weight, portable and highly maneuverable weapons of artillery caliber; a need for a sturdy, compact support for a sighting telescope for such named weapons, which support is attachable to these weapons, is quickly and accurately adjustable so that a sighting reticle in a telescope in the support is adjustable in azimuth and in elevation, and is also adjustable to correct for cant, and which support, additionally, is releasably interlockable with the sighting telescope; and, there exists a need for a sighting telescope for such named weapons, which telescope is quickly and easily inserted into and releasably interlocked with a support therefor without stressing the sighting telescope in such a way as to impair the telescope's effectiveness as a gun aiming instrument, and which telescope, further, is also quickly and easily unlocked from and withdrawn out of the support.

The earlier stated needs relating to artillery caliber weapons of the type stated are being adequately fulfilled by such comparatively new recoilless weapons as those disclosed in the following U.S. patents: 2,444,949 to C Walton Musser on July 13, 1948, for "Recoilless Firearm"; 2,466,714 to Wm. J. Kroeger et al. on April 12, 1949, for "Recoilless Firearm and Ammunition Therefor"; and 2,472,111 to Wm. J. Kroeger et al. on June 7, 1949, for "Recoillness Firearm and Ammunition Therefor."

However, the earlier stated needs relating to supports for sighting telescopes and to sighting telescopes themselves have, until our invention, for the most part not been met because supports and sighting telescopes used satisfactorily in the past on old, less mobile, less maneuverable weapons were inadequate to fulfill present day needs satisfactorily for one reason or another.

Therefore, in an effort to meet the stated present-day needs relating to adjustable supports for sighting telescopes and to sighting telescopes which are releasably interlockable with such supports, we have devised the support and the sighting telescope about to be described herein.

In practicing our invention, according to the named preferred embodiment, we provide a support and a sighting telescope, the support being attachable to a weapon of the character earlier named herein and including a member for receiving and releasably interlocking with the sighting telescope. This telescope receiving member is so tiltable in the support that the line of sight of the telescope in that receiving member is adjustable in azimuth and in elevation, and the telescope receiving member, additionally, is so rotatable in the support that the telescope's line of sight is adjustable to correct for cant of the weapon regardless of whether or not that receiving member is tilted. The sighting telescope further is releasably interlockable with the support's telescope receiving member.

As compared to art known to us, we believe patentable invention to reside in our concepts as follows: with respect to the support, in the structure providing for adjustably tilting the telescope receiving member in substantially perpendicular planes and for adjustably rotating the telescope receiving member about that member's axis regardless of whether or not that receiving member is tilted, and in the structure of the support's telescope receiving member, which structure provides for releasably interlocking the just-named member with the sighting telescope; with respect to the sighting telescope, in the structure providing for inserting and firmly seating that telescope in the support's receiving member, and providing for the releasably interlocking of the telescope and the support's receiving member; and, with respect to the combination of the support and the sighting telescope, in such combination wherein the support and the sighting telescope are releasably interlockable with each other, and in such combination wherein the support and the sighting telescope are releasably interlockable with each other and are adjustable as stated.

As the description of our invention proceeds, it will be obvious that we have devised new and inventive concepts which represent heretofore unknown advances in the art; and that the principles of our invention are applicable to supports other than to supports for sighting telescopes, and also applicable to numerous supported objects other than sighting telescopes.

One object of our invention is to provide a support which is releasably interlockable with the object supported.

Another object is to provide a support which provides for tilting the object supported in two imaginary, perpendicular planes and which also provides for rotating the object supported regardless of whether or not that object is tilted.

Yet another object is to provide a support which is releasably interlockable with the object supported and which provides for tilting and for rotating that object as earlier stated.

Still another object is to provide an article which is quickly and easily insertable into and releasably interlockable with a support therefor, and which is equally quickly and easily unlockable and extractable from the support without the need for tools, or the like.

A further object is to provide the combination of a support and of an article supported thereby, which support and article are releasably interlockable with each other; and A still further object is to provide the combination of a support and of an article supported thereby, which support provides for tilting and rotating the supported article as earlier stated, and which support and article are releasably interlockable with each other.

The foregoing and other objects of our invention will become apparent, along with many of the advantages thereof, from a full understanding of the invention gained from close inspection of the following specification and the accompanying drawings which describe and show, respectively, one preferred embodiment of our invention as applied to a support for the sighting telescope used in aiming a gun and as applied to the sighting telescope itself. Accordingly, in the drawings:

Fig. 1 is a side view of a portion of a representative recoilless gun, drawn in simplified form and in comparatively thin lines, as seen from the gunner's position, showing our support, showing a bracket to which the support is attached and through which the support is positioned in the desired relationship to the gun, and showing our sighting telescope firmly seated in and releasably interlocked with the support; the last-named parts (i.e., support, bracket, and telescope) being drawn in comparatively prominent lines.

Fig. 2 is a view taken along line 2—2 in Fig. 1, looking in the direction there indicated (i.e., toward the gun's muzzle), showing a portion of the gun's barrel drawn in comparatively thin lines, showing a portion of the bracket positioned between the barrel and the support, showing the support, and showing the sighting telescope as seen from the gun's breech; the last-named parts (i.e., the bracket, the support, and the telescope) being drawn in comparatively prominent lines.

Fig. 3 is a plan view taken along line 3—3 of Fig. 2, looking in the direction there indicated (i.e., from above), and showing another view of the parts shown in Fig. 2.

Fig. 4 is an enlarged view taken along line 4—4 of Fig. 1, looking in the direction there indicated (i.e., toward the gun's breech), showing a portion of the bracket to which our support is attached, the bracket and support being partly broken away and partly sectioned, and showing portions of our sighting telescope as seen from the gun's muzzle.

Fig. 5 is an enlarged view taken along line 5—5 of Fig. 1, looking in the direction there indicated (i.e., toward the gun's muzzle), showing a portion of the bracket, and showing the support without the sighting telescope, as seen from the gun's breech.

Fig. 6 is an enlarged vertical cross-section taken along line 6—6 of Fig. 4, looking in the direction there indicated (i.e., from one side of the support) and showing details of internal construction of the support, the sighting telescope having been removed; some of the support's components being shown in cross-section, other of the support's components being shown without cross-sectioning, and one of the support's components having been partly broken away and partly sectioned.

Fig. 7 is an enlarged horizontal cross-section taken along line 7—7 of Fig. 5, looking in the direction indicated (i.e., from above), and showing additional details of the support's internal construction; some of the support's components being shown in cross-section and others of the support's components being shown without cross-sectioning.

Fig. 8 is an enlarged, vertical cross-section taken along line 8—8 of Fig. 1, looking in the direction indicated (i.e., toward the gun's muzzle), and showing, in particular, other details of the support's internal construction (the sighting telescope having been removed); one of the support's components being shown without cross-sectioning.

Fig. 9 is an enlarged cross-section taken along line 9—9 of Fig. 3, looking in the direction there indicated (i.e., toward the gun's muzzle), and showing, in particular, more details of the support's internal construction (the sighting telescope having been removed); some of the support's components being shown without cross-sectioning.

Fig. 10 is a vertical cross-section of the support's socket, taken along line 10—10 of Fig. 5 and looking in the direction there indicated (i.e., from one side of the support), with part of our sighting telescope added and inserted part way into one end of the socket; the named figure showing some details of construction of our sighting telescope and showing further details of the support's socket.

Fig. 11 is an enlarged, partial cross-section taken along line 11—11 of Fig. 10, looking in the direction there indicated, and showing other details of construction of the sighting telescope; some of the telescope's components being shown without cross-sectioning.

Fig. 11A is similar to Fig. 11, but shows some of the telescope's components moved toward the right from the position shown in the latter figure.

Fig. 12 is an enlarged, partial end view of the telescope taken along line 12—12 of Fig. 10, looking in the direction there indicated, and showing more details of the telescope's construction; some of the components there shown being partly broken away and partly sectioned.

Fig. 13 is similar to Fig. 10 and shows the sighting telescope inserted farther into the support's socket.

Fig. 14 is cross-section taken along line 14—14 of Fig. 13 and looking in the direction there indicated, but the full circular cross-section of the support's socket is shown in the figure being described rather than just half as would appear if the figure were taken in strict accordance with line 14—14 of Fig. 13. Fig. 14 shows, among other things, that for a time during insertion of the sighting telescope into the support's socket, certain of the telescope's components project radially into respective grooves formed in the support's socket.

Fig. 15 is similar to Figs. 10 and 13, except that the left and right ends of the support's socket are shown without cross-sectioning. When compared to Figs. 10 and 13, Fig. 15 shows that the sighting telescope is fully inserted into and seated in the support's socket.

Fig. 16 is an end view taken along line 16—16 of Fig. 15, looking in the direction there indicated, and showing, in particular, certain relationships which exist between parts of the support's socket and parts of the sighting telescope when that telescope is fully inserted into, but not yet releasably interlocked with, that socket.

Fig. 17 is similar to Fig. 15 except that the support's socket is shown without cross-sectioning in the former figure and the sighting telescope has been rotated substantially ninety (90) degrees in the socket in preparation for releasably interlocking those parts together.

Fig. 18 is an end view similar to Fig. 16, but taken along line 18—18 of Fig. 17, looking in the direction there indicated, and showing, among other things, certain relationships which exist between parts of the support's socket and parts of the sighting telescope after that telescope has been rotated substantially ninety (90) degrees in the socket, in a clockwise direction from the position shown in Fig. 16, in preparation for releasably interlocking the telescope and the socket together.

Fig. 19 is a partial view taken along line 19—19 of Fig. 17, looking in the direction there indicated, and showing more details of the relationship which exists between part of the telescope and part of the socket when the telescope and the socket are in the relative position shown in Fig. 17.

Fig. 20 is similar to Fig. 17, except that certain of the telescope's components have been moved toward the right, from the respective positions shown in Fig. 17, to firmly seat the telescope in the socket and to releasably interlock those parts together.

Fig. 21 is a partial view similar to Fig. 19, but taken along line 21—21 of Fig. 20, looking in the direction there indicated, and showing further details of the relationship which exists between parts of the telescope and parts of the socket when those parts are releasably interlocked together.

In the following description, in which the just-named drawing figures are referred to, the construction of our support, the construction of our sighting telescope insofar as it relates to the insertion and releasably interlocking of that telescope with the support, and the operation of our invention will be explained in turn. Therefore, for convenience of later description, the support is identified by the reference character 25 (Figs. 1 through 9); and the sighting telescope is identified by the reference character 26 (Figs. 1 through 4, 10, 11, 11A, 13 and 15).

CONSTRUCTION

The support

In describing our support 25, it seems expedient to begin with housing 27 (Figs. 1 through 9). This housing, which has a somewhat triangular shape, as viewed in Figs. 2, 4, 5, 8 and 9, has a flat base 28 (Fig. 4), a gunner's side 29, a loader's side 30 which is joined to the gunner's side by a rounded apex 31 (Figs. 5 and 8), a breech-end surface 32 (Figs. 5 through 7), and a muzzle-end surface 33 (Figs. 4, 6 and 7); some of the just-named parts having been identified to facilitate reading of the drawings and attendant easy understanding of the invention.

As shown in Figs. 6 and 7, housing 27 is provided with a stepped cylindrical opening which extends through that housing between the housing's breech and muzzle-end surfaces 32 and 33, respectively; such opening having a portion 35 (Figs. 5 and 6) at the housing's breech-end surface 32, a larger diametered intermediate portion 36 (Figs. 6 through 8) which portion is adjacent to portion 35 and is joined thereto by an annular shoulder 37 (Fig. 6), and having a still larger diametered threaded portion 38 at the housing's muzzle-end surface 33, all of which just-named parts are concentric with each other.

Later, other parts of housing 27 will be identified as becomes necessary in the description.

Positioned in the housing's end-to-end opening is a cylindrical socket 40 (Figs. 4 through 9). This socket has a conical opening 41 (Figs. 5, 6, 8 through 10, 13 and 15) for later receiving telescope 26, which opening extends from end-to-end through the socket with the conical opening's larger diametered end facing in the same direction as the housing's breech-end surface 32 (Fig. 6), in the present instance, and with the conical opening's smaller diametered end, therefore, facing in the same direction as housing's muzzle-end surface 33.

In conical opening 41 are the diametrically opposed grooves 42 and 43 (Figs. 4, 5, 8, 9, 14 and 18) whose purpose will become apparent later. As shown for groove 42 in Fig. 10, both of the just-named grooves extend part way into the socket's conical opening 41 from that opening's smaller diametered end, the bottoms of the respective grooves being substantially parallel to the socket's axis.

Socket 40, also has, upon its exterior, lateral surface, a continuous radially projecting flange, which flange separates the socket's exterior, lateral surface into a portion 45 (Figs. 6, 7, 10 and 17) and a portion 46, which flange has a spherical rim 47 (Figs. 7, 10 and 17) generated from a center positioned on the socket's axis, and which flange, also, has the worm gear teeth 48 (Figs. 6, 8, 14 and 17) about which teeth more will be said later.

As shown in Fig. 6, the socket's portion 45 extends into portion 35 of the housing's stepped opening; the diameter of the socket's just-named portion being somewhat less than the diameter of the opening's named portion so that an annular space exists therebetween, which space allows for later tilting socket 40 in housing 27 as will be explained. As also shown in Fig. 6, the socket's portion 46 extends out beyond the housing's muzzle-end surface 33; this having been done for a purpose which will be apparent from subsequent description.

From Figs. 6 through 8, it is evident that socket 40 is supported in intermediate portion 36 of the housing's opening through the agency of the socket's spherical rim 47, the diameter of which spherical rim is slightly less than the diameter of intermediate portion 36. It is understandable, therefore, that, for the present, socket 40 is capable of being tilted in an infinite number of directions in housing 27 and also that socket 40 is capable of being rotated about its own axis in housing 27 regardless of whether or not the socket is tilted.

As this description proceeds, it will be explained that socket 40 is rendered capable of being tilted in two substantially perpendicular planes which intersect on the socket's axis and is rendered capable of being rotated about the socket's axis regardless of whether or not the socket is so tilted. Such tilting and rotation provides for adjusting the position of the telescope received by the socket, as will be explained later.

From Figs. 5, 7, 10 and 15, it is understandable that one end face 49 of socket 40 is a continuous, unbroken surface; while, from Figs. 4, 7, 10 and 15, it is understandable that the other end face of the named socket comprises a plurality of different areas and steps now to be described, which areas and steps provide for inserting telescope 27 into socket 40 and for releasably interlocking that telescope with that socket, as will be explained later.

For convenience of description, the just-mentioned end of socket 40 may be considered to comprise the areas 50 and 51 (Figs. 6, 7 and 16), the areas 52 and 53 (Fig. 16), and the areas 54 and 55 (Figs. 10 and 16). Disposed between those areas, as will presently be explained, are the steps earlier referred to, which steps will be identified presently.

Areas 50 and 51 are coplanar with each other and are farthermost of the named areas from the socket's opposite end 49.

Areas 52 and 53 are also coplanar with each other, but are closer to the socket's opposite end 49 than areas 50 and 51 so that a step 56 (Figs. 4, 6 and 15 through 17) exists between areas 50 and 52 and so that a similar step 57 (Figs. 4, 6, 7, 10, 16 and 18) exists between areas 51 and 53. As can be seen from Figs. 4 and 10, step 57 is continuous with one side of groove 42 in the socket's conical opening; and, as shown in Figs. 4 and 18, step 56 is continuous with one side of groove 43 of the just-named conical opening. The reason for the just-named conditions will become apparent as the description proceeds.

Areas 54 and 55 (Figs. 10 and 16) are also substantially coplanar with each other, but are still closer to the socket's opposite end 49 than areas 52 and 53; a step 58 (Figs. 10, 16 and 19) being formed between areas 53 and 55; a similar step 59 (Fig. 18) being formed between areas 52 and 54; a step 60 (Figs. 16, 18 and 19) being formed between areas 50 and 55; and a step 61 (Figs. 6, 10, 16 and 18), similar to step 60, being formed between areas 51 and 54.

For rotating socket 40 about its own axis in housing 27, thereby providing for later correcting the position of telescope 26, when in the socket, for cant, as will be explained, there is a worm 62 (Figs. 1, 6 and 8) which has a screw threaded portion 63 (Fig. 8), a shank portion 64, an annular flange 65, a worm threaded portion 66, and a nose portion 67, the just-named parts being concentric with each other. As to the appearance of the cross-section of worm 62, in Fig. 6 as an ellipse, it is pointed out that such condition results from the fact that the named worm is sectioned obliquely to its axis (see line 6—6 of Fig. 4).

As can be understood from Fig. 8, worm 62 is supported for rotation in housing 27 at the worm's flange and nose portions 65 and 67, respectively, with the worm's threaded portion 66 in meshing engagement with worm gear teeth 48 of socket 40. Therefore, it is understandable that rotation of worm 62 in a clockwise or in a counter clockwise direction, as viewed in Figs. 1 and 6, will result in rotation of socket 40 in a corresponding direction, as viewed in Fig. 8, in housing 27.

Serving to hold worm 62 in housing 27 and in the named meshing engagement with socket 40 is a retaining ring 68 (Fig. 8). This ring encircles the worm's shank portion 64 and is threadedly attached to housing 27, such threading being continued until the inner face (i.e., that face toward the housing) of the retaining ring lightly abuts the face of the worm's flange 65 adjacent thereto and until the worm has the minimum desirable end-shake in housing 27. To aid in the named threading of retaining ring 68 into housing 27, that ring may be provided with the spanner wrench recesses 69 (Fig. 8). Of course, after that ring is in the desired position, it can be secured in place in any convenient manner (not shown).

To facilitate rotation of worm 62, a knob 70 (Figs. 1 through 5 and 7 through 9) is provided. As shown in Fig. 8, this knob fits over the worm's screw threaded portion 63 and over part of the worm's shank portion 64, and is held securely in place on the named worm through the agency of a threaded retaining ring 71 (Figs. 1 and 8). As can be understood from Fig. 8, the just-named retaining ring threads onto the worm's portion 63 and fits into an accommodating recess in knob 70; the retaining ring being provided with the spanner wrench recesses 72.

Encircling portion 45 of socket 40 is a gimbal ring 75 (Fig. 6); the inside diameter (not shown) of that ring being a slide fit over the socket's just-named portion so that the gimbal ring, therefore, is tiltable along with the socket and so that the named socket is rotatable relative to that gimbal ring, as will become apparent later.

As shown in Fig. 6, the outside diameter of gimbal ring 75 is appreciably less than the diameter of intermediate portion 36 of the end-to-end opening through housing 27 so that an annular space exists therebetween; which space is provided for the same reason earlier stated herein with reference to the annular space between portion 35 of the end-to-end opening through housing 27 and portion 45 of socket 40.

As shown in Fig. 6, the inner face of gimbal ring 75 (i.e., that face toward the socket's flange) abuts one of that flange's faces, while that gimbal ring's outer face (i.e., that face toward shoulder 37 in housing 27) is free of any such abutment. As the description proceeds, it will become apparent that the named gimbal ring's outer face is left free of any abutment to allow for tilting of that gimbal ring and socket 40 during operation of the invention.

Partially set into the outer face of gimbal ring 75, in a manner presently to be explained, are the semi-cylindrical shoes 76 and 77 (one of which shoes is shown in Fig. 6, both of which shoes are shown in Fig. 7). The just-named shoes are substantially identical to each other, but those shoes, and their parts later to be named, are identified by different reference characters in order to facilitate reading and understanding of the drawing figures and to promote ready comprehension of the invention.

As to the shoe 76, the lateral surface of that shoe comprises an arcuate portion 78 (Figs. 6 and 7) and a flat portion 79. Also, shoe 76 has a flat, inner end 80 (Fig. 7) (i.e., that end toward socket 40), and a rounded outer end 81 (Figs. 6 and 7) (i.e., that end toward portion 36 of the end-to-end opening through housing 27).

Similarly, the lateral surface of shoe 77 comprises an arcuate and a flat portion 82 and 83, respectively (Fig. 7); and that shoe has a flat, inner end 84 and a rounded, outer end 85.

Shoes 76 and 77 are partially set into the outer face of gimbal ring 75 with the shoes' arcuate portions 78 and 82, respectively, accommodated in a mating arcuate groove which extends diametrically across that ring's face (as shown for shoe 76 in Fig. 6), with the shoes' flat portions 79 and 83, respectively, coplanar with each other and off-set from the named ring's outer face (as shown in Fig. 7), with the named shoes' inner ends 80 and 84, respectively, in abutment with the socket's portion 45 (Fig. 7), and with the shoes' rounded, outer ends 81 and 85, respectively, in abutment with intermediate portion 36 of the housing's end-to-end opening.

In the embodiment of our invention being described, it is important, for reasons which will later become apparent, that gimbal ring 75 be prevented from rotating about its axis in housing 27. To meet this need, gimbal ring 75 is provided with the two, substantially diametrically opposed lugs 86 and 87 (one of which lugs is shown in each of Figs. 6 and 7). These lugs are positioned on gimbal ring 75 on an imaginary diametrical line which is substantially forty-five (45) degrees to a similar line relating to shoes 76 and 77 and project radially outward from the named gimbal ring's circumferential surface into mating engagement with grooves 88 and 89, respectively (Figs. 4 and 8) formed in the stepped opening in housing 27; the edges of the just-named lugs being conveniently rounded to allow for later-to-be-discussed tilting of that gimbal ring in housing 27.

Also in intermediate portion 36 of the housing's end-to-end opening and also encircling portion 45 of socket 40 is a rotatable wedge ring 90 (Figs. 6, 7 and 9); this ring having an outer face 91 (Fig. 6) which faces toward portion 35 of the housing's opening and which is substantially perpendicular to that ring's axis, having an inner face 92 which faces toward gimbal ring 75 and which is inclined with respect to face 91, having worm gear teeth 93 (Figs. 6 and 9) formed in the ring's cylindrical, circumferential surface, and having an axial opening 94 (Fig. 7) which is parallel to that wedge ring's axis.

As shown in the figure just-named, the inside diameter of wedge ring 90 is appreciably larger than the outside of the socket's portion 45 so that an annular space exists therebetween; which space is provided for the same reason stated earlier herein with reference to the annular space between portion 35 of the end-to-end opening through housing 27 and portion 45 of socket 40.

As shown in Fig. 6, outer face 91 of wedge ring 90 is in abutment with annular shoulder 37 of housing 27; and, as shown in Fig. 7, that wedge ring's inner face is in abutment with flat portions 79 and 83 of the lateral surfaces of shoes 76 and 77, respectively. Therefore, it is understandable that rotation of wedge ring 90 about its axis in housing 27 will cause that ring's inclined, inner face 92 to act on shoes 76 and 77 so as to tilt gimbal ring 75 and socket 40 in housing 27. This will be more fully discussed when the operation of our invention is described.

For so rotating wedge ring 90, there is an adjusting worm 95 (Figs. 3, 5, 7 and 9). In the Fig. 7 cross-section worm 95 appears as an ellipse. This condition results from the fact that the named worm is sectioned obliquely to its axis (see line 7—7 of Fig. 5). This worm comprises a head portion 96 (Figs. 5 and 9), a worm-threaded body portion 97 (Fig. 9), and a plain, cylindrical nose portion 98.

As can be understood from the last-named figure, adjusting worm 95 is supported at its head and nose portions 96 and 98, respectively, by housing 27 with that worm's body portion 97 in meshing engagement with worm gear teeth 93 formed in wedge ring 90.

Serving to retain adjusting worm 95 in housing 27 and in the stated meshing engagement with wedge ring 90 is a set screw 99 (Figs. 5 and 9) which threads into housing 27 from that housing's breech end surface 32 (Fig. 5). Additionally, set screw 99 has an unthreaded nose portion 100 (Fig. 9) which is in mating engagement with a circumferential groove formed in adjusting worm 95 so that the just-named worm is retained in housing 27 and is rotatable as desired.

In the particular embodiment of our invention being described, adjusting worm 95 is later used, as will be explained, to adjust the position of socket 40 (and, therefore, the sighting telescope when in that socket) in azimuth. Therefore, to provide for ready identification of adjusting worm 95 to the person using our support, the letter "A" (Fig. 3), which stands for "azimuth," is formed, in any convenient manner, in housing 27 in the vicinity of that worm's head portion 96.

Encircling portion 46 of socket 40 is a gimbal ring 105 (Figs. 6 and 7); the inside diameter (not shown) of that ring being a slide fit over the socket's just-named portion so that the just-named gimbal ring, therefore, is tiltable along with socket 40 and so that the named-socket is rotatable relative to that gimbal ring, as will be apparent later. This ring is substantially identical to gimbal ring 75, earlier described, but is identified by a different reference character from that ring for the same reason stated earlier herein with reference to shoes 76 and 77.

As shown in Figs. 6 and 7, the outside diameter of gimbal ring 105, like the outside diameter of gimbal ring 75, is appreciably less than the diameter of intermediate portion 36 of the end-to-end, stepped opening through housing 27 so that an annular space exists therebetween; which space is provided for the same reason earlier stated herein with reference to the annular space between portion 35 of the end-to-end opening through housing 27 and portion 45 of socket 40.

As shown in the last-named figures, the inner face of gimbal ring 105 (i.e., that face toward the socket's flange) abuts the other one of that flange's faces, while that gimbal ring's outer face (i.e., that face toward portion 38 of the end-to-end opening in housing 27) is free of any abutment. As the description proceeds, it will become evident that the named gimbal ring's outer face is left free of any abutment for the same reason stated earlier herein with reference to the outer face of gimbal ring 75.

Partially set into the outer face of gimbal ring 105, in a manner presently to be explained, are the semi-cylindrical shoes 106 and 107 (one of which shoes is shown in Fig. 7, both of which shoes are shown in Fig. 6). These shoes are substantially identical to each other and to shoes 76 and 77, earlier described, but, along with parts later to be named, are identified by different reference characters from each other and from shoes 76 and 77 for reasons similar to those stated relative to gimbal rings 75 and 105.

Accordingly, as to shoe 106, the lateral surface of that shoe comprises an arcuate portion 108 (Figs. 6 and 7) and a flat portion 109. Also, shoe 106 has a flat, inner end 110 (Fig. 6) (i.e., that end toward socket 40) and a rounded, outer end 111 (Figs. 6 and 7) (i.e., that end toward portion 36 of the end-to-end, stepped opening through housing 27).

Similarly, the lateral surface of shoe 107 comprises arcuate and flat portions 112 and 113, respectively (Fig. 6); and the just-named shoe has a flat, inner end 114 and a rounded, outer end 115.

Shoes 106 and 107 are partially set into the outer face of gimbal ring 105 with the shoes' arcuate portions 108 and 112, respectively, accommodated in a mating arcuate groove extending diametrically across that ring's face (as shown for shoe 106 in Fig. 7), with the shoes' flat portions 109 and 113 coplanar with each other and offset from the named ring's outer face (as shown in Fig. 6), with the named shoes' inner ends 110 and 114, respectively, abutting the socket's portion 46 (Fig. 6), and with the shoes' rounded, outer ends 111 and 115, respectively, abutting intermediate portion 36 of the housing's end-to-end opening.

As earlier stated relative to gimbal ring 75, it is important, in the embodiment of the invention being described, that gimbal ring 105 be prevented from rotating about its axis in housing 27. Additionally, it is important, for reasons which will become apparent as the description proceeds, that shoes 106 and 107 in gimbal ring 105 be disposed substantially perpendicularly to shoes 76 and 77 in gimbal ring 75. To fulfill the just-stated conditions, gimbal ring 105 is provided with the two, diametrically opposed, radially projecting lugs 116 and 117 (Figs. 6 and 7, respectively) which are similar to lugs 86 and 87 on gimbal ring 75. As stated for the last-named lugs, lugs 116 and 117 are positioned on gimbal ring 105 on an imaginary diametrical line which is substantially forty-five (45) degrees to a similar line relating to shoes 106 and 107 and project radially outward from the named gimbal ring's circumferential surface into mating engagement with grooves 88 and 89, respectively (Figs. 4 and 8) formed in the end-to-end opening through housing 27; the edges of the just-named lugs being conveniently rounded to allow for later to be described tilting of gimbal ring 105 in housing 27.

Also in intermediate portion 36 of the stepped, end-to-end opening through housing 27, adjacent gimbal ring 105, and also encircling portion 46 of socket 40 is a rotatable wedge ring 120 (Figs. 6 and 7); the just-named ring having an outer face 121 (Fig. 7) which faces toward portion 38 of the housing's opening and which is substantially perpendicular to that ring's axis, having an inner face 122 (Fig. 7) which faces toward gimbal ring 105 and which is inclined with respect to face 121, having worm gear teeth 123 (Fig. 7) formed in that ring's cylindrical lateral surface, and having an axial opening 124 (Fig. 6) which is parallel to that wedge ring's axis.

Wedge ring 120, in the present instance, is substantially identical to wedge ring 90, earlier described, but the former ring and its parts, just named, are identified by different reference characters from those used to ientify the later wedge ring and its parts for the same reasons stated with respect to shoes 76 and 77 in gimbal ring 75.

As shown in Fig. 6, the inside diameter of wedge ring 120 is appreciably larger than the outside of the socket's portion 46 so that an annular space exists therebetween; which space is provided for the same reason stated earlier herein with reference to the annular space between portion 35 of the end-to-end opening through housing 27 and portion 45 of socket 40.

As can be understood from Fig. 6, the inclined, inner face of wedge ring 120 abuts flat portions 109 and 113 of shoes 106 and 107, respectively (also see Fig. 7 which shows, among other things, abutment of the named ring's inner face 122 and flat portion 109 of shoe 106). Therefore, it is understandable that rotation of wedge ring 120 about its axis in housing 27 will cause that ring's just-named inclined face 122 to act on shoes 106 and 107 so as to tilt gimbal ring 105, socket 40, and gimbal ring 75 in housing 27; such tilting being in a direction which is substantially perpendicular to the direction of tilting effected by rotation of wedge ring 90, as will be more fully explained when the operation of our invention is described.

For so rotating wedge ring 120, thereby providing for tilting socket 40, as stated, there is an adjusting worm 125 (Figs. 3, 4, 7 and 8), the head portion 126 of which worm is shown in Figs. 4 and 8; this worm having the elliptical shape shown in Fig. 7 because that worm is sectioned obliquely to its axis (see line 7—7 of Fig. 5).

Adjusting worm 125 is substantially identical to adjusting worm 95, earlier described, but is identified by a different reference character from that worm for the same reasons stated earlier herein with reference to shoes 76 and 77 in gimbal ring 75. Accordingly, worm 125 is supported in housing 27 in the manner earlier described for adjusting worm 95 (Fig. 9), is used in the same manner with reference to wedge ring 120 as adjusting worm 95 is used with reference to wedge ring 90, and is retained in housing 27 in the same manner that adjusting worm 95 is retained in that housing; that is, by a plain nose set screw 127 (Fig. 4) which threads into the housing's muzzle-end surface 33 and engages in a circumferential groove in the worm under discussion. Therefore, further details relating to adjusting worm 125, per se, do not seem necessary.

In the embodiment of the invention being described, adjusting worm 125 is used, as will be explained later, in adjusting the position of socket 40 and, therefore, sighting telescope 26 later inserted into and releasably interlocked with that socket, in elevation. Therefore, to serve as a reminder of that fact to the gunner, the letter "E" (Fig. 3), which letter stands for "Elevation," is formed, in any convenient manner, in housing 27 in the vicinity of that worm's head portion.

Adjacent wedge ring 120 in intermediate portion 36 of the stopped, end-to-end opening through housing 27 is a spacer ring 128 (Fig. 7) which encircles portion 46 of socket 40 just like gimbal ring 120, earlier described.

As shown in the just-named figure, the inner and outer faces of spacer ring 128 (i.e., those faces toward and away from wedge ring 120, respectively) are substantially parallel to each other and substantially parallel to the housing's annular shoulder 37.

As also shown in the last-named figure, the inner face of spacer ring 128 abuts outer face 121 of wedge ring 120 for reasons obvious from the description thus far.

As further shown in the last-named figure, the inside diameter 129 of spacer ring 128 is somewhat larger than the outside diameter of the socket's portion 46 so that an annular space is formed therebetween which space is provided for the same reason stated earlier herein with reference to the annular space provided between portion 35 of the end-to-end opening through housing 27 and portion 45 of socket 40.

Adjacent spacer ring 128 is a cap ring 130 (Figs. 1, 3, 4, 6 and 7). This ring has, inter alia, an externally threaded portion 131 (Fig. 7) and an annular shoulder 132 adjacent thereto.

As can be understood from Figures 6 and 7, the just-named cap ring's threaded portion 131 is screwed into internally threaded portion 38 of housing 27, the cap ring encircling portion 46 of socket 40 just like spacer ring 128 and wedge ring 120, both earlier described, until the cap ring's shoulder 132 is seated against the housing's muzzle-end surface 33. To enable cap ring 130 to be firmly seated against housing 27, as just stated, that ring is provided with the spanner wrench holes 133 (Figs. 4 and 7). After cap ring 130 is so joined to housing 27, that ring may be secured in place in any convenient manner, as by staking (not shown).

As shown in Fig. 7, the inside diameter 134 of cap ring 130 is appreciably larger than the diameter of the socket's portion 46 so that an annular space exists between those parts; which space is provided for the same reason stated earlier herein with reference to the annular space provided between portion 35 of the end-to-end opening through housing 27 and portion 45 of socket 40.

With cap ring 130 joined to housing 27, as explained, that ring's inner end face (i.e., that face toward spacer ring 128) lightly abuts the spacer ring's outer face so that the cap ring serves to maintain socket 40, gimbal ring 75 and that ring's shoes 76 and 77, wedge ring 90, gimbal ring 105 and that ring's shoes 106 and 107, wedge ring 120, and spacer ring 128 in assembled relationship in housing 27; but yet allows for the earlier stated rotation of wedge rings 90 and 120 with attendant tilting of socket 40 in housing 27, as will later be explained, and also allows for rotation of socket 40 in housing 27 independently of whether or not the socket is tilted.

For sealing the annular space, earlier mentioned, existing between portion 35 of the stepped opening through housing 27 and portion 45 of socket 40 so as to prevent entrance of foreign material into housing 27 without interfering with the tilting or with the rotating of that socket in that housing, there is a sealing ring 135 (Fig. 7) which is made of resilient material.

As can be understood from the just-named figure, this ring encircles the socket's portion 45; the resilience of the ring's material causing that ring to press against the socket so as to form a sealing relationship with that socket. As can also be understood from the last-named figure, the outer, annular portion of sealing ring 135 is accommodated in an annular groove formed in portion 35 of the housing's end-to-end, stepped opening, which groove is of convenient size and shape so that sealing ring 135, besides acting as a seal on the socket's portion 45, as stated, acts to seal the groove, thereby sealing the annular space between the socket and the housing, but yet not interfering with the tilting or with the rotating of the socket in that housing.

For similarly sealing the annular space, earlier mentioned, between inside 134 of cap ring 130 and portion 46 of socket 40, there is a sealing ring 136 (Fig. 7). This ring is substantially identical to sealing ring 135, just described, but is identified by a different reference character from that ring for the same reasons stated with reference to shoes 76 and 77 in gimbal ring 75.

As can be understood from the last-named figure, sealing ring 136 encircles the socket's portion 46; the resilience of the ring's material causing that ring to press against the socket so as to form a sealing relationship with that socket. As can also be understood from the same figure, the outer, annular portion of sealing ring 136 is accommodated in an annular groove formed inside cap ring 130, which groove is of convenient size and shape so that sealing ring 136, besides acting as a seal on the socket's portion 46, as stated, acts to seal the groove, thereby sealing the annular space between the socket and the cap ring, but yet not interfering with the tilting or with the rotating of the socket in housing 27.

As shown in Fig. 4, support 25 rests upon a flat portion 140 of a bracket 141 with a tongue 142 on the just-named portion in mating engagement with a groove 143 formed in flat base 28 of the support's housing 27; the just-named housing being secured to the bracket as by the screws 144 employed with the washers 145 in usual manner represented in the last-named figure.

As shown in Figs. 2, 4, 5, and 9, bracket 141 also has the arms 146 and 147 which are joined, in convenient manner, as by casting, to opposite ends, respectively, of the bracket's portion 140 (Fig. 4) and which are similarly joined to each other by the web 148 (Fig. 2), which web is also joined to the bracket's portion 140.

From Fig. 2, it can be understood that the bracket's arms 146 and 147, and its web 148, collectively, encircle the barrel 149 of a representative recoilless gun 150 (also see Fig. 1), on which support 25 and telescope 26 are to be used, and extend away from the barrel's axis.

As can be understood from Figs. 1 through 3, bracket 141 serves to position support 25 in a conveniently spaced relationship to the gun's barrel 149; the axis of the stepped opening through the support's housing 27 being disposed above the axis of barrel 149, as can be understood from Figs. 1 and 2; being disposed substantially parallel to the barrel's axis, as can be understood from Figs. 1 and 3; and being disposed off to one side of the barrel's axis, as can be understood from Figs. 2 and 3.

Bracket 141 is secured, in any convenient manner (not shown), to barrel 149 in convenient proximity to a crank handle 151, or like member (Fig. 1), which handle is near the gun's breech-end 152 and which handle forms part of a mechanism (not shown) for positioning gun 150 in elevation; and, bracket 141 is also secured to barrel 149 in convenient proximity to another similar crank handle, or like member (not shown), which forms part of another mechanism (not shown) for positioning gun 150 in azimuth.

Additionally, bracket 141 is secured in a rotative position about the axis of barrel 149, as viewed in Fig. 2, so that, with barrel 149 in the position shown in Fig. 1, shoes 76 and 77 (Fig. 7) in the support's gimbal ring 75 are in an imaginary, substantially horizontal plane, and shoes 106 and 107 (Fig. 6) in gimbal ring 105 are in an imaginary substantially vertical plane.

Such positioning of bracket 141 is effected so that, when telescope 26 is later inserted into and releasably interlocked with support 25, as will be explained later, one person positioned to one side of gun 150 can, whenever necessary, easily and quickly adjust the position of the telescope through the agency of knob 70 and adjusting worms 95 and 125, as will also be explained later, can aim the gun in the usual manner by adjusting the gun's position in azimuth and elevation, and can fire the gun in known manner through the agency of a trigger (not shown) positioned in a trigger handle 153 carried by crank handle 151.

*The sighting telescope*

In the embodiment of the invention being described, sighting telescope 26 has the L shape best shown in Figs. 3, 10, 13 and 15. Initially, this telescope may be considered to comprise a hollow, conical portion 155 (Figs. 10, 11, 11A, 13 and 15); a hollow, cylindrical, externally threaded portion 156 (Figs. 10, 11, 11A and 17); a box-like portion 157 (Figs. 1 through 3, 10 and 17); and a tubular eyepiece portion 158 (Figs. 1 through 4, 10, 14 and 17). Preferably, the telescope's just-named cylindrical portion 156 is provided with a right-hand thread.

As can best be understood from Figs. 10, 13 and 15, the telescope's conical portion 155, externally threaded portion 156, and box-like portion 157 are arranged concentrically and in alignment with each other; and eyepiece portion 158, which has an eyepiece shade 159 (Figs. 2 and 3), is arranged substantially perpendicular to box-like portion 157, thus forming the L shape stated. Eyepiece portion 158, however, may have any one of a variety of other relationships with the box-like portion without affecting our invention.

Inside telescope 26 are optical and other related components (not shown), including a sighting reticle, which make up the telescope's sighting system proper. For orientation purposes, two of the telescope's optical components, namely the eyepiece lens 160 (Figs. 1 and 17) and the objective lens 161 (Figs. 4, 12 and 14) are shown. Such optical and related components are of known form and arrangement, and are not the subject of the present invention. Therefore, additional details relating thereto do not seem to be necessary.

With respect to sighting telescope 26, our invention is concerned with that telescope's conical and cylindrical portions 155 and 156, respectively, and with other later to be identified components associated therewith, which comprise a structure providing for the inserting of and for the releasably interlocking of the telescope with the support's socket 40, as will be explained later. Therefore, subsequent description relating to sighting telescope 26 will deal, for the most part, with matters pertaining to the structure mentioned.

As can be understood from Figs. 10, 13 and 15, the sighting telescope's conical portion 155 is intended to fit inside conical opening 41 of the support's socket 40. For that reason, the telescope's conical portion 155, which portion is provided with a clearance groove 162 (also see Fig. 11), has substantially the same slope of taper as the named conical opening; the diameter at the larger end of the telescope's conical portion being somewhat larger than the diameter at the larger end of the socket's opening so that, when the telescope is later inserted into the socket, as will be explained, the telescope's conical portion 155 can become seated in the socket's opening 41.

In substantially diametrically opposed relationship to each other in the telescope's conical and cylindrical portions 155 and 156, respectively, are the draw bars 163 and 164 (one of which bars is shown in each of Figs. 3, 10, 11, 11A, 13 and 15; both of which draw-bars are shown in Figs. 1, 2, 14, 16, 17, 18 and 20); drawbar 163 being accommodated in a groove 165 (Figs. 10, 11 and 11A) formed in the telescope's conical and cylindrical portions 155 and 156, respectively, and also being slidable in that groove in a direction along the axis of the telescope's named conical and cylindrical portions; and draw-bar 164 being accommodated in a similar groove 166 (Fig. 2) in the telescope's conical and cylindrical portions and also being similarly slidable in that groove. These draw-bars, as will be explained later herein, are used in firmly seating telescope 26 in the support's socket 40 and in releasably interlocking that telescope and that socket together.

Draw-bar 163 has, among other parts to be identified presently, a breech-end 167 (Figs. 10, 11, 17 and 20), a muzzle-end 168 (Fig. 11), a sloping, intermediate portion 169 (Figs. 10 and 11) and a locking projection 170 (Figs. 10, 11, 12, and 14).

As shown in Fig. 11, the inner surface of the just-named draw-bar's breech end 167 (i.e., that surface toward the axis of the telescope's conical and cylindrical portions 155 and 156, respectively) is substantially parallel to the just-named axis and rests upon a corresponding portion of groove 165; and the outer surface of breech end 167 (i.e., that surface away from the axis of the telescope's named conical and cylindrical portions) is outside the diameter of the telescope's cylindrical portion (also see Fig. 17).

As to muzzle-end 168 of draw-bar 163, that end, the inner surface of which (i.e., that surface toward the axis of the telescope's conical and cylindrical portions) is substantially parallel to the inner surface of that bar's breech-end 167 (Fig. 11), extends through the wall of the telescope's conical portion 155 so that the inner surface of the named draw-bar's muzzle-end rests upon a portion 171 of a ring 172, disposed in the smaller diametered end of the telescope's conical portion 155, which ring will be described later.

With reference to intermediate portion 169 of draw-bar 163, the inner and outer surfaces of that portion (i.e., those surfaces toward and away from the axis of the telescope's conical portion 155) are substantially parallel to each other, but are inclined relative to the just-named axis, as shown in Fig. 11; the draw-bar's intermediate portion 169 having substantially the same slope as the telescope's conical portion, and the bottom of groove 165 being sloped accordingly.

As to locking projection 170 of draw-bar 163, that projection, as shown in Fig. 11, extends out beyond the telescope's conical portion, the projection extending radially outward (Figs. 12, 14 and 16) with reference to the named conical portion. Also, opposite sides of the named locking projection are beveled, as at 173 and 174 (Figs. 10 and 12); which beveling facilitates insertion of telescope 26 into the support's socket 40 as will become apparent later when the operation of our invention is described.

Ring 172 (Figs. 11, 11A and 12), in addition to having portion 171, earlier named, has a smaller diametered, externally threaded portion 175 (Fig. 11), a larger diametered flange 176 (Figs. 11 and 12), and an annular shoulder 177 (Fig. 11), which shoulder joins the ring's portion 171 and 175.

Ring 172, as earlier stated, is positioned in the smaller diametered end of the telescope's conical portion 155; the ring's externally threaded portion 175 being in mating engagement with a similarly threaded opening 178 (Figs. 11 and 12) in the telescope's conical portion, the ring's shoulder 177 abutting a shoulder 179 (Fig. 11) in the telescope's conical portion, and the ring's flange 176 being received in a recess 180 (Figs. 11, 11A and 12) in the telescope's conical portion.

In Figs. 11 and 12 it is apparent that the outside diameter of portion 171 of ring 172 is appreciably less than the diameter of recess 180 in the telescope's conical portion 155 so that an annular space exists therebetween. Accommodated in the just-mentioned space are the coplanar tabs 181 and 182 (one of which tabs is shown in each of Figs. 11 and 11A, both of which tabs are shown in Fig. 12). As shown in the last-named figure, tabs 181 and 182 extend outwardly from opposite sides of draw-bar 163; the inside surface of those tabs (i.e., that surface toward the axis of ring 172) being continuous with the inner surface of the named draw-bar's muzzle-end 168 (Fig. 11). As can be understood from Fig. 12, tabs 181 and 182 serve to retain the inner surface of the just-named muzzle-end of draw-bar 163 in contact with portion 171 of ring 172.

Draw-bar 164 (Figs. 1, 2, 17, 18 and 20) is substantially identical to draw-bar 163 just described, but the former draw-bar and the presently to be named parts thereof, which parts are shown in the drawings and which correspond respectively, to earlier named parts of the later draw-bar, are identified by different reference characters from those used with reference to the latter draw-bar for the same reasons stated with reference to earlier described gimbal rings 75 and 105 (Figs. 6 and 7). Accordingly, the breech end of draw-bar 164 is identified by the reference character 183 (Figs. 17 and 20), locking projection by the reference character 185 (Figs. 14 and 16 through 19), and the just-named projection's opposite beveled sides by the reference characters 186 and 187 (Fig. 19). Also, of course, draw-bar 164 has an intermediate portion (not shown) which is substantially identical to intermediate portion 169 of draw-bar 163, and draw-bar 164 has a pair of tabs (also not shown) which are substantially identical to tabs 181 and 182 of draw-bar 163. Furthermore, draw-bar 164 is accommodated in the telescope's conical and cylindrical portions 155 and 156, respectively, in substantially the same manner as shown for draw-bar 163 in Figs. 11 and 11A.

On the telescope's externally threaded, cylindrical portion 156 is a rotatable, internally threaded draw-ring 190 (Figs. 1 through 3, 10, 11, 14 and 17). As shown in Fig. 11, draw-ring 190 is in mating engagement with an accommodating groove formed in breech-end portion 167 of draw-bar 163. Similarly, draw-ring 190 is in mating engagement with an accommodating groove (not shown) in breech-end 183 of draw-bar 164.

Therefore, it is understandable that draw-ring 190 serves to retain the breech-ends 167 and 183 of draw-bars 163 and 164, respectively, in grooves 165 and 166, respectively, as shown for breech-end 167 of draw-bar 163 in Fig. 11. Also, it is understandable that rotation of draw-ring 190 in a clockwise or in a counterclockwise direction, as viewed in either of Figs. 2, 14, 16 and 18, will cause that draw-ring to move rectilinearly in a direction along the axis of the telescope's conical and cylindrical portions 155 and 156, respectively; the amount and direction of such movement depending upon the amount and direction of the draw-ring's rotation.

Inasmuch as draw-bars 163 and 164 are in the earlier explained mating engagement with draw-ring 190, the just-stated movement rotation and attending rectilinear movement of that draw-ring will result in simultaneous movement of the draw-bars in a direction parallel to the axis of the telescope's conical and cylindrical portions 155 and 156, respectively; the amount and direction of the draw-bars' movement being the same as the amount and direction of the draw-ring's rectilinear movement. As will later be explained, the just-stated movement of draw-bars 163 and 164 provides for firmly seating telescope 26 in the support's socket 40, and for releasably interlocking the telescope and the socket together.

In Fig. 11, draw-bar 163 has, in consequence of rotation of draw-ring 190 in one direction on the telescope's threaded portion 156, been moved as far as possible toward the left in that drawing figure with reference to the telescope's conical portion 155. Note, in the named figure, that a step 191 (also see Fig. 11A) formed in draw-bar 163 is in abutment with flange 176 on ring 172, thereby preventing further movement of that draw-bar in the stated direction and also, in consequence, preventing further rotation of draw-ring 190. Note also, in Fig. 11, that the outer surface of intermediate portion 169 of draw-bar 163 is substantially flush with the telescope's conical portion 155. The significance of the just-stated conditions will become apparent when the operation of the invention is explained.

From previous description herein, it is understandable that the conditions just stated with reference to draw-bar 163 also apply equally to draw-bar 164.

In Fig. 11A, draw-bar 163 has, in consequence of rotation of draw-ring 190 in an opposite direction on the telescope's threaded portion 156, been moved as far as possible toward the right in that drawing figure with reference to the telescope's conical portion 155. Note, in the last-named figure, that a step 192 (also see Fig. 11) formed in draw-bar 163 is in abutment with part of the conical portion's wall thickness, thereby preventing further movement of that draw-bar in the stated direction and also, in consequence, preventing further rotation of draw-ring 190 in the last-stated direction; such action preventing the draw-ring from being disengaged from the telescope's threaded portion 156. Note also, in Fig. 11A, that the outer surface of intermediate portion 169 of draw-bar 163 is now within the profile of the telescope's conical portion 156.

From previous description herein, it is understandable that the conditions just stated with reference to draw-bar 163 also apply equally to draw-bar 164.

It can easily be understood that, when telescope 26 is later inserted into and releasably interlocked with the support's socket 40, as will be explained later, draw-bars 163 and 164 do not abut the conical portion's wall thickness as shown for draw-bar 163 in Fig. 11A. Instead, the draw-bars releasably interlock with the support's socket before such abutment takes place.

OPERATION OF INVENTION

*Inserting the telescope into the support and releasably interlocking those parts together*

In order to insert sighting telescope 26 into the support's socket 40 and to releasably interlock the telescope and the socket together, the operation of our invention is as follows.

Initially, the telescope's draw-ring 190 (Figs. 1 through 3, 10, 11, 11A, 14 and 17) is rotated on externally threaded portion 156 until draw-bars 163 and 164 are in the position shown for draw-bar 163 in Figs. 10, 11, 13 and 15 relative to the smaller diametered end of the telescope's conical portion 155. Also, see Fig. 17 wherein both draw-bars are in the just-stated position.

Then the telescope's conical portion 155 is inserted into the larger diametered end of conical opening 41 in the support's socket 40, as shown in Fig. 10, with the telescope's draw-bars 163 and 164 (one of which is seen) in alignment with the socket's grooves 42 and 43 (one of which is also seen). As such insertion is continued, the draw-bars' respective locking projections 170 and 185 pass along the socket's grooves 42 and 43; locking projection 170, in the present instance, passing along groove 43 and locking projection 185 passing along groove 42, as can be understood from Fig. 14. To facilitate a better understanding of our invention later herein, note, in Fig. 10, that the telescope's eyepiece portion 158 is toward the top of the drawing sheet.

The stated insertion is continued until the telescope's conical portion 155 is seated in the socket's conical opening 41, as shown in Fig. 15. Telescope 26 is now fully inserted into the support's socket 40, but those parts are not yet releasably interlocked with each other. How this is done will be described presently. For the same reason stated earlier herein, note, in the last-named figure, that the telescope's eyepiece position is still toward the top of the drawing sheet.

However, before continuing with the just-named description, it is to be noted, in Fig. 15, that one side of locking projection 170 on draw-bar 163 is in abutment with step 56 on socket 40 (also see Fig. 16). Additionally, it can be understood, from the just-named figure, that a similar abutting relationship exists between one side of locking projection 185 on draw-bar 164 and step 57 on socket 40. Consequently, because of such abutments, telescope 26 can not be rotated in any other direction than in a clockwise direction, as viewed in Fig. 16, relative to socket 40.

Therefore, to releasably interlock telescope 26 and the support's socket 40, the telescope is rotated in the socket in the clockwise direction indicated by the arrowed line 201 (Fig. 16) from the position shown in the just-named figure to the position shown in Figs. 4 and 18. In other words, telescope 26 is rotated in socket 40 from the position shown in Fig. 15 to the position shown in Figs. 1, 17 and 20.

Upon such rotation, one side of locking projection 170 on draw-bar 163 abuts the socket's step 61 (Fig. 18) and one side of locking projection 185 on draw-bar 164 simultaneously, similarly abuts the socket's corresponding step 60 (Fig. 19), thereby preventing further rotation of the telescope in the stated direction in the socket.

Finally, the telescope's draw-ring 190 is rotated on the telescope's externally threaded portion 156, in the clockwise direction indicated by the arrowed line 202 in Fig. 18, so that the draw-ring moves, in a direction along the named threaded portion's axis, away from the stepped end of socket 40 (i.e., the draw-ring moves from the position shown in Figs. 11 and 17 to the position shown in Figs. 1, 11A and 20); which movement, because of the earlier described mating engagement between the draw-ring and the draw-bars (Figs. 11 and 11A), slides those draw-bars simultaneously in their respective grooves 165 and 166 in the telescope so that locking projections 170 and 185 on those bars, respectively, are moved toward the socket's earlier described stepped end.

As such rotation of draw-ring 190 is continued, locking projection 185 on draw-bar 164 is moved between the socket's steps 58 and 60 (compare Figs. 19 and 21) and, similarly, locking projection 170 on draw-bar 163 is moved simultaneously between the socket's steps 59 and 61 (Fig. 18). This stated rotation is continued until the inner face of locking projection 185 (i.e., that face toward the socket's stepped end) abuts the socket's area 55 (Fig. 21), and until a corresponding face on locking projection 170 simultaneously abuts the socket's area 54. After that, draw-ring 190 is turned a little farther so that the telescope's conical portion 155 is drawn into firm seating engagement with the socket's conical opening 41. Thus, telescope 26 and the support's socket 40 are releasably interlocked together.

From the description just given it can be easily understood that the stress applied to telescope 26 incident to the described interlocking of the telescope with the support's socket 40 is evenly distributed over a large area, thereby avoiding high local stresses and possible distortion of the telescope's optical system.

With sighting telescope 26 (Figs. 1 through 3) inserted into and releasably interlocked with the support's socket 40, as explained, the telescope's eyepiece portion 158 and eyepiece shade 159 thereon assume such position relative to gun 150 and relative to the gun's positioning mechanisms that one person can, while looking into the telescope, adjust the position of the telescope's sighting reticle in azimuth, in elevation, or to correct for cant, as will be explained more fully presently; and can aim and fire that gun in usual manner.

The operation of our invention in releasing the interlocking engagement between the telescope 26 and the support's socket 40, and in withdrawing that telescope from that socket, is just the opposite of the operation of the invention just described; and, therefore, is believed to be readily understandable therefrom. Consequently, it does not seem necessary to describe the operation of the invention in releasing the named interlocking engagement between the telescope and the socket and in withdrawing the telescope from the socket.

*Adjusting the position of the telescope*

Adjustment of the position of telescope 26 in azimuth, in elevation, and adjustment of the position of the telescope to correct for cant, which adjustments are for the purpose of positioning the telescope's sighting reticle (not shown) in the desired relationship to the image of a selected target seen upon looking into the telescope, can be made independently of each other, as will be explained presently, or in any combination as may be necessary, during the bore-sighting of the telescope and the gun or during actual use of the gun.

To adjust the position of telescope 26 in azimuth, the telescope is looked into in usual fashion and the support's azimuth adjusting worm 95 (Figs. 2, 3, 5, 7 and 9) is rotated, by any convenient means acting on that worm's head portion 96, in a clockwise or in a counterclockwise direction, as viewed in Figs. 3 and 7, depending upon the direction in which adjustment in azimuth is to be made. This is done for the purpose of tilting the support's socket 40 and telescope 26 seated in and releasably interlocked with that socket so that the telescope's sighting reticle (not shown) is moved from left to right, or vice versa, with reference to the image of a selected target (not shown), assumed to be stationary, seen in the telescope's field of view; the rotation of adjusting worm 95 being continued in the direction required until the desired relationship, in azimuth, between the telescope's sighting reticle and the target image is established.

How the position of the telescope's sighting reticle is adjusted in azimuth, in consequence of rotating the support's worm 95, can be understood from the following explanation.

Rotation of adjusting worm 95 causes corresponding rotation of wedge ring 90 (Figs. 6, 7 and 9), inasmuch as that worm and that ring are in the earlier described meshing engagement (Fig. 9) with each other; the amount and direction of the wedge ring's rotation depending upon the amount and direction of the named worm's rotation. In other words, if worm 95 be rotated in one direction, as viewed in Fig. 3, wedge ring 90 is rotated in one direction in housing 27, as viewed in Fig. 9; and, conversely, if the named worm be rotated in the opposite direction, as viewed in Fig. 3, the named wedge ring is rotated in the opposite direction, as viewed in Fig. 9. The just-stated directions of rotation of worm 95 are indicated by the double arrowed, arcuate line 203 drawn to the left of that worm in Fig. 3; and the last-stated directions of rotation of wedge ring 90 are indicated by the double arrowed, arcuate line 204 drawn inside conical opening 41 of socket 40 in Fig. 9.

As wedge ring 90 is so rotated, that ring's inclined face 92 (Fig. 6) acts upon flat portions 79 and 83 (Fig. 7) of shoes 76 and 77, respectively, in gimbal ring 75 so that the just-named gimbal ring is tilted accordingly in the support's housing 27; gimbal ring 75 being restrained from rotating along with wedge ring 90 because of the engagement, earlier described, between the named gimbal ring's 86 and 87 (Figs. 6 and 7, respectively) with the named housing's grooves 88 and 89, respectively (Fig. 4).

Inasmuch as gimbal ring 75 (Fig. 6) fits on socket 40 and abuts one face of that socket's flange, inasmuch as that flange's opposite face abuts gimbal ring 105, and inasmuch as shoes 106 and 107 in the last-named gimbal ring abut wedge ring 120, as earlier stated, rotation of wedge ring 90 causes tilting of gimbal ring 75, socket 40, and gimbal ring 105 about arcuate portions 108 and 112 of the lateral surface of shoes 106 and 107, respectively, in gimbal ring 105. Such tilting is in an imaginary plane which passes through the socket's axis and can be more easily understood from the following explanation which relates to Fig. 7.

In Fig. 7, arrowed, solid line 195 represents a portion of the axis of socket 40 when that socket is in a central position of adjustment in azimuth; arrowed, dashed line 196 represents the same portion of the socket's axis when the socket is tilted in the extreme position of adjustment, in azimuth, toward the left; and arrowed, dashed line 197 represents the same portion of the socket's axis when the socket is tilted in the extreme position of adjustment, in azimuth, toward the right.

Inasmuch as telescope 26 is seated in and releasably interlocked with socket 40, as explained, the just-stated tilting of that socket represented in Fig. 7, causes corresponding tilting of the named telescope and attendant movement of the telescope's sighting reticle in azimuth relative to the image of the target, as can be understood by reference to Fig. 3 and the following explanation.

In Fig. 3, arrowed, solid lines d and d' represent a portion of the line of sight into the telescope's eyepiece portion 158 and a portion of the same line of sight from the telescope's conical portion 155, respectively, when the support's socket 40 and the telescope therein are in such position that the telescope's line of sight is in a central position of adjustment in azimuth; similarly, arrowed, dashed lines e and e' represent the same portions of the telescope's line of sight when the support's socket and the telescope therein are tilted so that the telescope's line of sight, from the telescope's conical portion, is in the extreme position of adjustment, in azimuth, toward the right; and arrowed, dashed lines f and f' represent the same portions of the telescope's line of sight when the support's socket and the telescope therein are tilted so that the telescope's line of sight, from the telescope's conical portion, is in the extreme position of adjustment, in azimuth, toward the left.

To adjust the position of telescope 26 in elevation, the telescope is looked into in usual fashion and the support's adjusting worm 125 (Figs. 3, 4, 7 and 8) is rotated, by any convenient means acting on that worm's head portion, in a clockwise or in a counterclockwise direction, as viewed in Figs. 3 and 7, depending upon the direction in which adjustment in elevation is to be made. This is done for the purpose of tilting the support's socket 40 and telescope 26 seated in and releasably interlocked with that socket so that the telescope's sighting reticle (not shown) is moved up or down, as may be desired, with reference to the image of a selected target (not shown) seen in the telescope's field of view; the rotation of adjusting worm 125 being continued in the direction necessary until the desired relationship, in elevation, between the telescope's sighting reticle and the target image is established.

The action resulting from rotation of elevation adjusting worm 125 is similar to the action, earlier described, resulting from rotation of azimuth adjusting worm 95, except that rotation of worm 125 causes tilting of socket 40 and telescope 26 therein so that the telescope's sighting reticle is moved up or down, as the case may be, relative to a target image seen in the telescope. However, to avoid the possibility of any misunderstanding, the action resulting from rotation of the former adjusting worm will be described presently.

Rotation of adjusting worm 125 causes corresponding rotation of wedge ring 120 (Figs. 6 and 7), inasmuch as that worm and that ring are in the earlier described meshing engagement with each other; the amount and direction of the wedge ring's rotation depending upon the amount and direction of the named worm's rotation as can be understood from earlier description herein relating to worm 95 and wedge ring 90.

As wedge ring 120 is so rotated, that ring's inclined face 122 (Fig. 7) acts upon flat portions 109 and 113 (Fig. 6) of shoes 106 and 107, respectively, in gimbal ring 105 so that the just-named gimbal ring is tilted accordingly in the support's housing 27; gimbal ring 105 being restrained from rotating along with wedge ring 120 because of the engagement, earlier described, between the named gimbal ring's lugs 116 and 117 (Figs. 6 and 7, respectively) with the named housing's grooves 88 and 89 respectively (Fig. 4).

Inasmuch as gimbal ring 105 (Fig. 6) fits on socket 40 and abuts one face of that socket's flange, inasmuch as that flange's opposite face abuts gimbal ring 75, and inasmuch as shoes 76 and 77 (Fig. 7) in the last-named gimbal ring abut wedge ring 90, as earlier stated, rotation of wedge ring 120 causes tilting of gimbal ring 105, socket 40, and gimbal ring 75 about arcuate portions 78 and 82 of shoes 76 and 77, respectively, in gimbal ring 75. Such tilting is in an imaginary plane which passes through the socket's axis and is substantially perpendicular to the last-named imaginary plane, which tilting can be more easily understood from the following explanation which relates to Fig. 6.

In Fig. 6, arrowed, solid line 198 represents a portion of the axis of socket 40 when that socket is in a central position of adjustment in elevation; arrowed, dashed line 199 represents the same portion of the socket's axis when the socket is tilted in the extreme position of adjustment below the just-named central position; and arrowed, dashed line 200 represents the same portion of the socket's axis when the socket is tilted in the extreme position of adjustment above the named central position.

Inasmuch as telescope 26 is seated in and releasably interlocked with socket 40, as explained, the just-stated tilting of that socket, represented in Fig. 6, causes corresponding tilting of telescope 26 and attendant movement of that telecsope's sighting reticle up or down with reference to the image of a target viewed through the telescope, as can be understood by reference to Fig. 1 and the following explanation.

In Fig. 1, the arrowed, solid line a represents a portion of the line of sight from telescope 26 when the support's socket and the telescope therein are in such a position in housing 27 that the telescope's line of sight is in a central position of adjustment in elevation; similarly, arrowed, dashed line b represents the same portion of the telescope's line of sight when the socket and the telescope are tilted so that the telescope's line of sight is in the extreme position of adjustment above the just-named central position; and, arrowed, dashed line c represents the same portion of the telescope's line of sight when the socket and the telescope therein are tilted so that the telescope's line of sight is in the extreme position of adjustment below the named central position. Thus the telescope's reticle is moved up or down, as the case may be, with reference to the image of a target appearing in the telescope's field of view.

To adjust the position of telescope 26 to correct for cant, the telescope is looked into in usual fashion and the support's cant adjusting worm 62 (Figs. 1, 6 and 8) is rotated, through the agency of knob 70 (also see Figs. 2 through 5, 7 and 9), in a clockwise or in a counterclockwise direction, as viewed in Figs. 1 and 6, depending upon the direction in which correction for cant is to be made. This is done for the purpose of rotating the support's socket 40 and telescope 26 seated in and releasably interlocked with that socket in an imaginary plane substantially perpendicular to the socket's axis, regardless of whether or not that socket is tilted in azimuth or in elevation, so that the telescope's sighting reticle is also rotated in an imaginary plane substantially perpendicular to the socket's axis relative to the image of a selected target (not shown) seen in the telescope's field of view; rotation of worm 62 being continued in the direction necessary until the desired relationship between the telescope's sighting reticle and the target image is established.

How rotation of worm 62 causes the stated rotation of socket 40 and telescope 26 therein, and attendant rotation of the telescope's sighting reticle relative to the target image can be understood from the following explanation.

Rotation of worm 62 causes corresponding rotation of the support's socket 40, inasmuch as that worm and that socket are in the earlier described meshing engagement (Fig. 8) with each other; the amount and direction of the socket's rotation depending upon the amount and direction of the worm's rotation.

In other words, if worm 62 be rotated in one direction, as viewed in Fig. 1, socket 40 is rotated in one direction in housing 27, as viewed in Fig. 8; and conversely, if worm 62 be rotated in the opposite direction, as viewed in Fig. 1, socket 40 is rotated in the opposite direction, as viewed in Fig. 8. The just-named directions of rotation of worm 62 are indicated by the double arrowed, arcuate line 205 (Fig. 1); and the last-stated directions of rotation of socket 40 are indicated by the double arrowed, arcuate line 206 (Fig. 8).

Inasmuch as telescope 26 is seated in and releasably interlocked with socket 40, as explained, the stated rotation of socket 40 causes rotation of the telscope's coaxial conical, cylindrical and box-like portions 155, 156 and 157, respectively (the latter two just-named portions being shown in Fig. 2) and attendant rotation of the telescope's sighting reticle relative to the target image; such sighting reticle being conveniently disposed in either one of the just-named portions. Hhis can be more easily understood from the following explanation which relates to the last-named figure.

In Fig. 2, the support's socket (not shown) and telescope 26 therein are in such rotated position of adjustment in housing 27 that the telescope's eyepiece portion 158, which portion has eyepiece shade 159 (shown in solid lines), is in a central position of adjustment, at which time the telescope's sighting reticle is in a central position of adjustment in cant. The dashed line showing of a portion 159¹ of the telescope's eyepiece shade drawn below the solid line showing of that shade is intended to indicate that the socket and the telescope have been rotated, in the counterclockwise direction indicated by the arrowed, arcuate line 207, so that the telescope's eyepiece portion and eyepiece shade have been moved, in the stated direction, from the central position to one extreme position of rotative adjustment below the named central position, at which time the telescope's sighting reticle, also, is in one extreme position of adjustment in cant. And, the dashed line showing of a portion 159¹¹ of the telescope's eyepiece shade drawn above the solid line showing of that shade is intended to indicate that the socket and the telescope have been rotated, in a clockwise direction indicated by the arrowed, arcuate line 208, so that the telescope's eyepiece portion and eyepiece shade have been moved, in the stated direction, from the central position to the other extreme position of rotative adjustment above the named central position, at which time the telescope's sighting reticle, also, is in the other extreme position of adjustment in cant.

Inasmuch as socket 40 and telescope 26 therein are adjustably tiltable through a certain range of adjustment in azimuth, are adjustably tiltable through a certain other range of adjustment in elevation, and are also adjustably rotatable through a still another certain range of adjustment to correct for cant, as eariler explained, it follows that socket 40 and telescope 26 therein, actually, are adjustably rotatable to correct for cant in any one of a plurality of planes, each of which is substantially perpendicular to the line of intersection of the azimuth and elevation planes; or, in other words, each plane in which the socket and the telescope are adjustably rotatable to correct for cant is substantially perpendicular to the axis of the named socket.

SUMMARY

From the foregoing description and the accompanying drawings, it is evident that we have provided a support which is releasably interlockable with the object supported; that we have provided a support which provides for tilting the object supported in two, imaginary, perpendicular planes and which also provides for rotating the object supported regardless of whether or not that object is tilted; that we have provided a support which is releasably interlockable with the object supported and which provides for tilting and for rotating that object as stated; that we have provided an article which is insertable into and releasably interlockable with a support therefor; that we have provided the combination of a support and of an article supported thereby, which support and article are releasably interlockable with each other; and that we have provided the combination of a support and of an article supported thereby, which support provides for tilting and rotating the supported article, as earlier stated, and which support and article are releasably interlockable with each other.

Those in the art understand that our invention is amenable to numerous modifications and variations without departing from the spirit and scope of our original concept. For that reason, we do not want our invention to be limited only by the relatively narrow confines inherent in the one preferred embodiment described herein and shown in the accompanying drawings for illustrative purposes only. Instead, we want our invention to be limited only by the metes and bounds of the following claims.

We claim:

1. A support in which the position of the object supported is adjustably tiltable in an imaginary plane and is also adjustably rotatable in a plurality of imaginary planes each substantially perpendicular to the first-named plane, such support comprising: a housing having an opening therethrough, which opening has two annular shoulders disposed in spaced substantially parallel relaionship to each other, and which opening also has two substantially diametrically opposed grooves; a socket for receiving and seating an object to be supported by the support, said socket having an external, annular flange the rim of which is a portion of a spherical surface generated from a point on said socket's axis, said socket being disposed in said housing's opening with that socket's annular flange positioned between the annular shoulders in that opening, and said socket being supported at the socket's rim by said housing but otherwise being annularly spaced from said housing's opening so that said socket is adjustably tiltable in said housing in an imaginary plane passing through that socket's axis and so that said socket is also adjustably rotatable in said housing in a plurality of imaginary planes each of which is substantially perpendicular to the imaginary plane in which said socket is adjustably tiltable; a gimbal ring having a pair of diametrically opposed, radially projecting lugs, said gimbal ring encircling said socket between one face of that socket's flange and one of the annular shoulders in said housing's opening, the outside of said gimbal ring being annularly spaced inwardly from said housing's opening, the inner face of said gimbal ring abutting that one face of said socket's flange, and said gimbal ring's lugs being engagement, respectively, with the grooves in said housing's opening so that said gimbal ring is tiltable along with said socket, so that said gimbal ring is prevented from rotating about its own axis in said housing, and so that said socket is adjustably rotatable relative to said gimbal ring; a pair of semi-cylindrical shoes, said shoes being disposed opposite each other in said gimbal ring's outer face along an imaginary diametrical line, the cylindrical portions of the lateral surfaces of said shoes being partially set into said gimbal ring's outer face, and the flat portions of the lateral surfaces of said shoes being off-set from said gimbal ring's outer face and also facing toward one annular shoulder in said housing's opening; and a wedge ring encircling said socket between said one face of that socket's flange and the one annular shoulder in said housing's opening and supported for rotation about its own axis by said housing, the inside of said wedge ring being annularly spaced from the outside of said socket, the outer face of said wedge ring being substantially perpendicular to that ring's axis and also being in abutment with the one annular shoulder in said housing's opening, and the inner face of said wedge ring being inclined with respect to that ring's axis and also being in abutment with the flat portion of said shoes; whereby, upon rotation of said wedge ring, said socket and said gimbal ring are adjustably tilted in an imaginary plane in said housing about the cylindrical portions of the lateral surfaces of said shoes; and whereby said socket is adjustably rotatable about its own axis in said housing in a plurality of planes substantially perpendicular to plane in which said socket is tilted, thus providing for correspondingly adjusting the position of an object received and seated in said socket.

2. The support of claim 1 plus means for rotating the wedge ring for the purpose of adjustably tilting the socket in an imaginary plane; and plus means for adjustably rotating the socket in an infinite number of planes substantially perpendicular to the plane in which the socket is tiltable.

3. The support of claim 1 plus means for sealing the space between the housing's opening and the outside of the socket but yet allowing for adjustably tilting and for adjustably rotating the socket in the housing.

4. The support of claim 1 in which the socket and the wedge ring are each provided with gear teeth.

5. The support of claim 4 plus: a first worm supported in the housing and in meshing engagement with the socket's gear teeth so that rotation of said first worm causes rotation of the socket; and a second worm supported in the housing and in meshing engagement with the wedge ring's gear teeth so that rotation of said second worm causes rotation of the wedge ring and attendant tilting of the socket and of the gimbal ring.

6. In a sighting telescope for aiming a gun, which telescope is insertable into and interlockable releasably with a support attached to the gun, the combination of: a hollow conical member for fitting into the support; an externally threaded hollow cylindrical member concentric to said conical member, said cylindrical member being adjacent to and integral with the larger diametered end of said conical member; an internally threaded draw-ring on said cylindrical member, said draw-ring being rotatable on said cylindrical member and, therefore, being movable rectilinearly along the axis of said conical and cylindrical members in consequence of such rotation; an externally shouldered ring removably attached to the inside of the smaller diametered end of said conical member, part of the exterior surface of said shouldered ring being annularly spaced from the inside of said conical member; and a pair of draw-bars, each of said draw-bars having, at one end thereof, a locking projection and a pair of tabs, which tabs project from opposite sides of the locking projection, each said draw-bar fitting in a groove in said conical and cylindrical members, being substantially diametrically opposite each other and being slidable a limited amount in opposite directions along the axis of said conical and cylindrical members, one end of each of said draw-bars extending through an opening in the wall of said conical member and resting on said shouldered ring with said draw-bars' tabs accommodated in the annular space between said shouldered ring and the inside of said conical member and with said draw-bars' locking projections extending radially outward in opposite directions from said conical member, and with the other end of each of said draw-bars being in mating engagement with said draw-ring; whereby, upon rotation of said draw-ring in one direction on said cylindrical member prior to insertion of the telescope into the support, said draw-bars are moved rectilinearly in one direction along the axis of said conical and cylindrical members so that the telescope can be inserted into and interlocked releasably with the support; and whereby, upon rotation of said draw-ring in the opposite direction following insertion of the telescope into the support, said draw-bars are moved rectilinearly in the opposite direction along the axis of said conical and cylindrical members so that the telescope is firmly seated in the support and so that the telescope and the support are interlocked releasably together.

7. A gun fire control device including a support having a conical seat with a pair of grooves extending inwardly from the small end of said seat and partially therethrough, a telescope including a conical member having raised collars formed to engage said seat rotatably and having grooves at their opposite sides, a pair of draw bars each arranged to move in a different groove of said conical member and said support and each having outward extensions at its opposite ends, and a draw ring threaded onto said telescope and arranged to engage the extensions at one end of said draw bars, the extensions at the other end of said draw bars being arranged to engage said support upon rotation of said conical member and to draw said member into said support upon rotation of said draw ring.

8. A gun fire control device according to claim 7 wherein said support has a first step which limits the rotation of said bars in one direction and a second step which limits the rotation of said bars in the opposite direction.

References Cited in the file of this patent

UNITED STATES PATENTS

| | | |
|---|---|---|
| 542,063 | Mohn | July 2, 1895 |
| 606,536 | Glauber | June 28, 1898 |
| 945,517 | Goodwin | Jan. 4, 1910 |
| 1,885,321 | Benn | Nov. 1, 1932 |
| 2,125,932 | Lennon | Aug. 9, 1938 |
| 2,676,063 | Whitt | Apr. 20, 1954 |
| 2,773,437 | Knauf | Dec. 11, 1956 |